United States Patent
Masumura et al.

(10) Patent No.: US 11,556,783 B2
(45) Date of Patent: Jan. 17, 2023

(54) CONFUSION NETWORK DISTRIBUTED REPRESENTATION GENERATION APPARATUS, CONFUSION NETWORK CLASSIFICATION APPARATUS, CONFUSION NETWORK DISTRIBUTED REPRESENTATION GENERATION METHOD, CONFUSION NETWORK CLASSIFICATION METHOD AND PROGRAM

(71) Applicant: NIPPON TELEGRAPH AND TELEPHONE CORPORATION, Chiyoda-ku (JP)

(72) Inventors: Ryo Masumura, Yokosuka (JP); Hirokazu Masataki, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 309 days.

(21) Appl. No.: 16/641,779

(22) PCT Filed: Aug. 21, 2018

(86) PCT No.: PCT/JP2018/030776
§ 371 (c)(1),
(2) Date: Feb. 25, 2020

(87) PCT Pub. No.: WO2019/044583
PCT Pub. Date: Mar. 7, 2019

(65) Prior Publication Data
US 2020/0218975 A1  Jul. 9, 2020

(30) Foreign Application Priority Data
Sep. 4, 2017 (JP) .............................. JP2017-169325

(51) Int. Cl.
*G06N 3/08* (2006.01)
*G06N 3/04* (2006.01)
*G10L 15/16* (2006.01)

(52) U.S. Cl.
CPC ................. *G06N 3/08* (2013.01); *G06N 3/04* (2013.01); *G10L 15/16* (2013.01)

(58) Field of Classification Search
CPC .................................. G06N 3/08; G06N 3/04
See application file for complete search history.

(56) References Cited

PUBLICATIONS

Jagfeld, Encoding Word Confusion Networks with Recurrent Neural Networks for Dialog State Tracking, Aug. 9, 2017, arXiv, whole document (Year: 2017).*

(Continued)

*Primary Examiner* — Sonia L Gay
(74) *Attorney, Agent, or Firm* — Oblon, McClelland, Maier & Neustadt, L.L.P.

(57) ABSTRACT

There is provided a technique for transforming a confusion network to a representation that can be used as an input for machine learning. A confusion network distributed representation sequence generating part that generates a confusion network distributed representation sequence, which is a vector sequence, from an arc word set sequence and an arc weight set sequence constituting the confusion network is included. The confusion network distributed representation sequence generating part comprises: an arc word distributed representation set sequence transforming part that, by transforming an arc word included in the arc word set to a word distributed representation, obtains an arc word distributed representation set and generates an arc word distributed representation set sequence; and an arc word distributed representation set weighting/integrating part that generates the confusion network distributed representation sequence from the arc word distributed representation set sequence and the arc weight set sequence.

8 Claims, 5 Drawing Sheets

(56) References Cited

PUBLICATIONS

Ravuri, S. et al., "Recurrent Neural Network and LSTM Models for Lexical Utterance Classification", In Proc. INTERSPEECH Sep. 6-10, 2015, pp. 135-139.
Kim, Y., "Convolutional Neural Networks for Sentence Classification", Proceedings of the 2014 Conference on Empirical Methods in National Language Processing (EMNLP), Oct. 25-29, 2014, pp. 1746-1751.
Mangu, L. et al., "Finding consensus in speech recognition: word error minimization and other applications of confusion networks", Computer Speech and Language, vol. 14, 2000, pp. 373-400.
International Search Report dated Nov. 13, 2018 in PCT/JP2018/030776 filed on Aug. 21, 2018.

* cited by examiner

ARC WORD SET SEQUENCE $W_1, W_2, W_3, W_4, W_5 =$
$(w_{11}, w_{12}, w_{13}), (w_{21}, w_{22}, w_{23}, w_{24}),$
$(w_{31}, w_{32}, w_{33}), (w_{41}, w_{42}, w_{43}, w_{44}, w_{45}), (w_{51}, w_{52})$

ARC WEIGHT SET SEQUENCE $C_1, C_2, C_3, C_4, C_5 =$
$(c_{11}, c_{12}, c_{13}), (c_{21}, c_{22}, c_{23}, c_{24}),$
$(c_{31}, c_{32}, c_{33}), (c_{41}, c_{42}, c_{43}, c_{44}, c_{45}), (c_{51}, c_{52})$

CONFUSION NETWORK DISTRIBUTED REPRESENTATION GENERATION APPARATUS, CONFUSION NETWORK CLASSIFICATION APPARATUS, CONFUSION NETWORK DISTRIBUTED REPRESENTATION GENERATION METHOD, CONFUSION NETWORK CLASSIFICATION METHOD AND PROGRAM

TECHNICAL FIELD

The present invention relates to a technique for generating a distributed representation of a confusion network.

BACKGROUND ART

In a spoken dialogue system, it is common to estimate an utterance intention or an utterance act from a result of speech recognition about a user's speech and decide an action of a system based on the estimation result. This estimation of an utterance intention and an utterance act is realized by configuring a class classifier that classifies text that is a word sequence into a certain class. For example, in the case of estimation of an utterance act, it is a problem of estimating a label of "question", with text "Do you sell juice here?" as an input. Performance of this class classifier has a great influence on whether a smooth spoken dialogue is possible or not.

As a main method for configuring such a class classifier, there is a method in which pieces of text (word sequences) paired with labels to be classification destinations (hereinafter referred to as class labels) are prepared, and a class classifier is configured by machine learning. In the case of handling the problem described above, it becomes possible to learn a class classifier by preparing a large amount of learning data in which one class label is attached to each piece of text (each word sequence). For example, it is possible to learn a class classifier by preparing learning data in which a class label is attached to each of 100000 pieces of text.

As a method for precisely learning the class classifier, deep learning technology is useful. There have been proposed some methods using deep learning. As representative methods, there are a method using a recurrent neural network (RNN) (Non-patent literature 1) and a method using a convolutional neural network (CNN) (Non-patent literature 2).

A class classifier using RNN and a class classifier using CNN are almost the same. That is, by transforming each word in text (a word sequence) to be an input, to a word vector called a word distributed representation, transforming a word distributed representation sequence, which is a sequence of the word vector, to a fixed-length real-valued vector using RNN or CNN and inputting the real-valued vector to a discriminant function, a class classifier can be realized.

The following is more detailed description of the above. When $w_1, w_2, \ldots, w_T$ is assumed to be a word sequence of input text, a class classifier estimates a class label by executing such processing as below.

$$\omega_t = \text{EMBEDDING}(w_t)$$

$$h = NN(\omega_1, \omega_2, \ldots, \omega_T)$$

$$P = \text{DISCRIMINATE}(h) \qquad \text{[Formula 1]}$$

Here, $\omega_t (1 \leq t \leq T)$ denotes a word distributed representation (a word vector) of a word $w_t$; h denotes a fixed-length real-valued vector obtained by transforming a word distributed representation sequence $(\omega_1, \omega_2, \ldots, \omega_T)$; and P denotes probability distribution indicating a posterior probability corresponding to each class.

Here, EMBEDDING(•) is a function of transforming a word to a word vector of a predetermined dimensionality; and EMBEDDING(•) is indicated, for example, as a linear transformation function. Note that EMBEDDING(•) is not limited to linear transformation but may be any function if the function has a similar function.

Here, NN(•) is a function of transforming a real-valued vector sequence to a fixed-length real-valued vector. As NN(•), for example, RNN or CNN can be used. Note that NN(•) is not limited to RNN or CNN but may be any function if the function has a similar function.

Here, DISCRIMINATE(•) is a function for calculating a posterior probability corresponding to each class from a fixed-length vector. As DISCRIMINATE(•), for example, a softmax function can be used.

At the time of estimating a class label, a class with the highest probability in the probability distribution P is estimated as a class label of the input text.

PRIOR ART LITERATURE

Non-Patent Literature

Non-patent literature 1: Suman Ravuri, Andreas Stolcke, "Recurrent Neural Network and LSTM Models for Lexical Utterance Classification", In Proc. INTERSPEECH 2015, pp. 135-139, 2015.

Non-patent literature 2: Yoon Kim, "Convolutional Neural Networks for Sentence Classification", In Proc. EMNLP 2014, pp. 1746-1751, 2014.

SUMMARY OF THE INVENTION

Problems to be Solved by the Invention

In the learning of a class classifier using RNN or CNN described above, it is common to use a pair of speech text that does not include a speech recognition error (that is, speech text the speech recognition rate of which is 100%) and a class label. However, when learning is performed using speech text that does not include a speech recognition error, a speech recognition error influences much at the time of actually using a spoken dialogue system at sites. That is, a problem occurs that accuracy of estimation of a class label for speech text that includes a speech recognition error, which is not included in learning data, is significantly reduced. This is due to mismatch between input data at the time of learning a class classifier and input data at the time of estimating a class label.

Therefore, there may be a case where learning is performed using a pair of speech text generated by a speech recognizer and including a speech recognition error and a class label. However, when learning is performed using speech text including a speech recognition error, the mismatch between input data at the time of learning and input data at the time of estimating is eliminated, but a problem occurs that performance of a class classifier itself is reduced because learning is performed from the speech text including a speech recognition error.

The above two problems are due to using only speech text indicating a speech recognition result. Therefore, it is conceivable to use various information generated at the time of speech recognition (hypothesis space at the time of speech recognition) including the speech recognition result. As a method for handling such various information, there is a confusion network (see Reference non-patent literature 1). (Reference non-patent literature 1: Lidia Mangu, Eric Brill, Andreas Stolcke, "Finding consensus in speech recognition: word error minimization and other applications of confusion networks", Computer Speech and Language, vol. 14, pp. 373-400, 2000.)

However, though it is necessary to represent the confusion network so that the confusion network can be used as an input for learning in order to make it possible to learn a class classifier using the confusion network, a confusion network representation method suitable for this purpose has not existed so far.

Therefore, an object of the present invention is to provide a technique for transforming a confusion network to such a representation that can be used as an input for machine learning.

Means to Solve the Problems

An aspect of the present invention includes a confusion network distributed representation sequence generating part that, when T is assumed to be an integer equal to or larger than 1, and $W_t=(w_{t1}, w_{t2}, \ldots, w_{tN\_t})$ ($1 \leq t \leq T$) and $C_t=(c_{t1}, c_{t2}, \ldots, c_{tN\_t})$ ($1 \leq t \leq T$) are assumed to be a t-th arc word set constituting a confusion network (wherein $w_{tn}$ ($1 \leq n \leq N_t$; $N_t$ is an integer equal to or larger than 1) denotes an arc word included in the arc word set $W_t$) and a t-th arc weight set constituting the confusion network (wherein $c_{tn}$ ($1 \leq n \leq N_t$) denotes an arc weight corresponding to the arc word $w_{tn}$), respectively, generates a confusion network distributed representation sequence $U_1, U_2, \ldots, U_T$, which is a vector sequence, from an arc word set sequence $W_1, W_2, \ldots, W_T$ and an arc weight set sequence $C_1, C_2, \ldots, C_T$ constituting the confusion network; and the confusion network distributed representation sequence generating part comprises: an arc word distributed representation set sequence transforming part that, by transforming the arc word $w_{tn}$ included in the arc word set $W_t$ to a word distributed representation $\omega_{tn}$, obtains an arc word distributed representation set $\Omega_t=(\omega_{t1}, \omega_{t2}, \ldots, \omega_{tN\_t})$ and generates an arc word distributed representation set sequence $\Omega_1, \Omega_2, \ldots, \Omega_T$; and an arc word distributed representation set weighting/integrating part that generates the confusion network distributed representation sequence $U_1, U_2, \ldots, U_T$ from the arc word distributed representation set sequence $\Omega_1, \Omega_2, \ldots, \Omega_T$ and the arc weight set sequence $C_1, C_2, \ldots, C_T$.

Effects of the Invention

According to the present invention, by representing a confusion network as a confusion network distributed representation sequence, which is a vector sequence, it becomes possible to use the confusion network as an input for machine learning.

DETAILED DESCRIPTION OF THE EMBODIMENTS

Embodiments of the present invention will be described below in detail. Note that the same number will be given to components having the same function, and duplicate description will be omitted.

Prior to description of the embodiments, a notation method in this specification will be described.

Here, _(underscore) indicates a subscript. For example, $x^{y\_z}$ indicates that $y_z$ is a superscript of x, and $x_{y\_z}$ indicates that $y_z$ is a subscript of x.

Next, a confusion network will be described. A confusion network is a structure that efficiently represents hypothesis space at the time of speech recognition and is a structure represented as a graph composed of nods and arcs (see FIG. 1).

Each arc of a confusion network obtained at the time of speech recognition corresponds to a word (hereinafter referred to as an arc word), and each word has a probability of being correct (hereinafter referred to as an arc weight). A confusion network in FIG. 1 includes seventeen arc words $w_{11}, w_{12}, w_{13}, w_{21}, \ldots, w_{52}$, and an arc weight, which is a probability of an arc word $w_{tn}$ being correct, is $c_{tn}$. Note that, for an arbitrary t, $\Sigma_n c_{tn}=1$ is satisfied.

Figure 1:
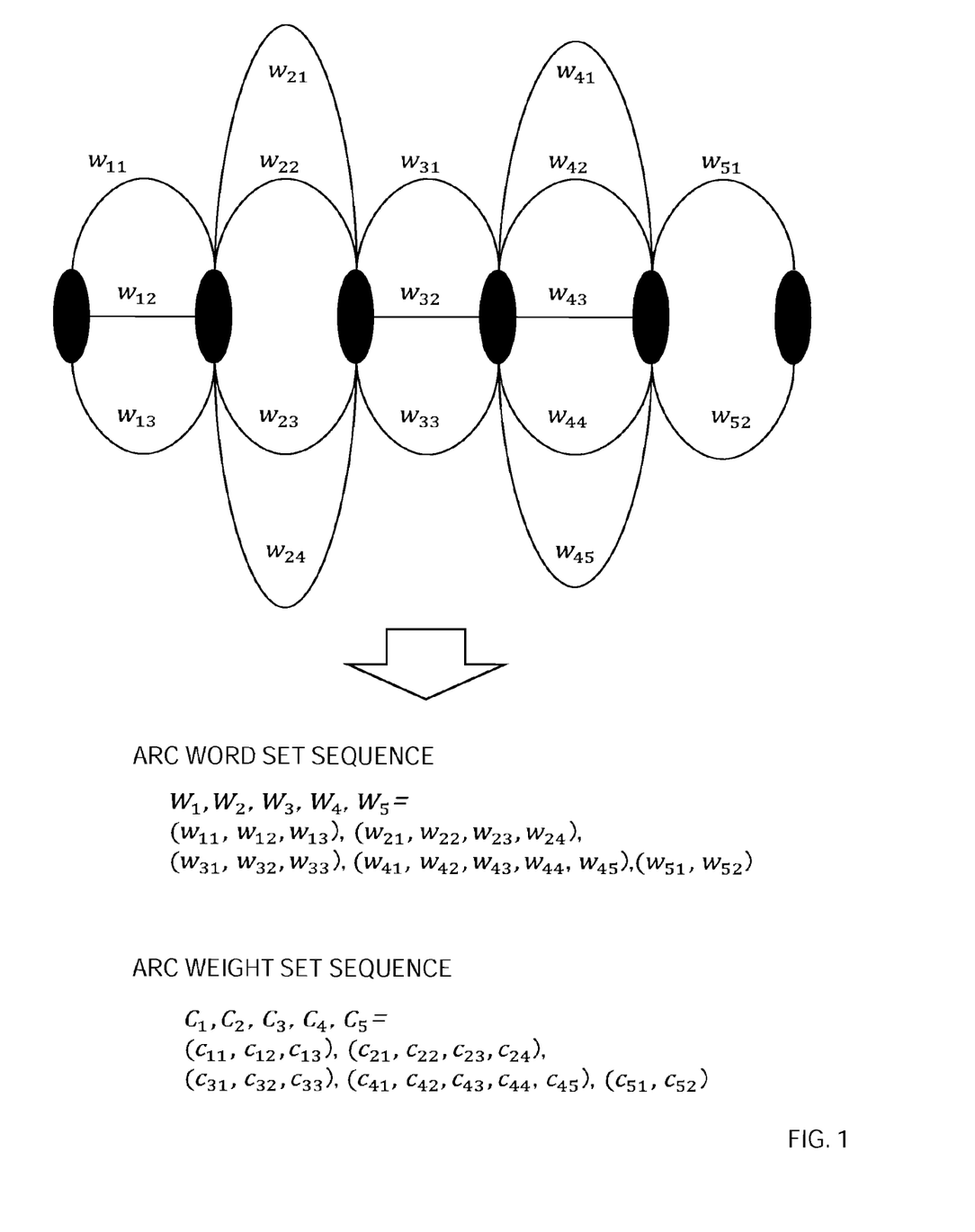
FIG. 1 is a diagram showing an example of a relationship among a confusion network, an arc word set sequence and an arc weight set sequence.

An important point is that, by causing such a word that a start node (corresponding to start time) and an end node (corresponding to end time) are the same (hereinafter, a set of such words will be referred to as an arc word set) to be located as an arc between the same nodes, it is possible to represent hypothesis space at the time of speech recognition as a confusion network which is a pair of an arc word set sequence and an arc weight set sequence (a sequence of arc weight set corresponding to the arc word set). In the example of FIG. 1, an arc weight set corresponding to an arc word set $W_1=(w_{11}, w_{12}, w_{13})$ is $C_1=(c_{11}, c_{12}, c_{13})$, and a pair of an arc word set sequence $W_1, W_2, W_3, W_4, W_5$ and an arc weight set sequence $C_1, C_2, C_3, C_4, C_5$ indicates a confusion network.

For details of the confusion network, see Reference non-patent literature 1.

First Embodiment

Figure 2:
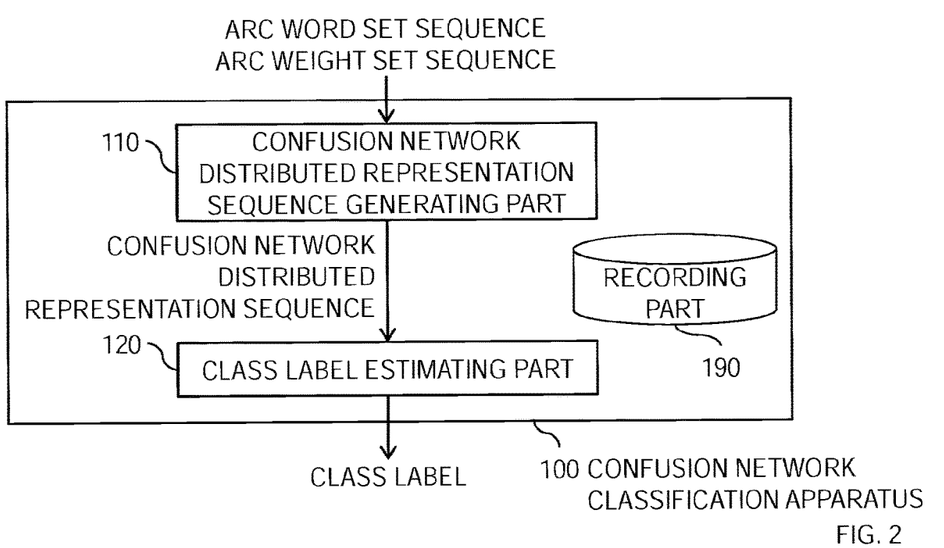
FIG. 2 is a diagram showing an example of a configuration of a confusion network classification apparatus 100.
Figure 3:
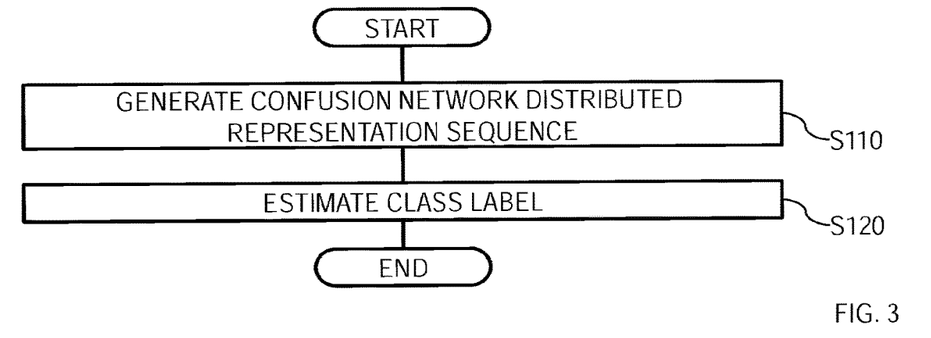
FIG. 3 is a diagram showing an example of an operation of the confusion network classification apparatus 100.

A confusion network classification apparatus 100 will be described below with reference to FIGS. 2 and 3. FIG. 2 is a block diagram showing a configuration of the confusion network classification apparatus 100. FIG. 3 is a flowchart showing an operation of the confusion network classification apparatus 100. As shown in FIG. 2, the confusion network classification apparatus 100 includes a confusion network distributed representation sequence generating part 110, a class label estimating part 120 and a recording part 190. The recording part 190 is a component that appropriately records information required for processing by the confusion network classification apparatus 100.

The confusion network classification apparatus 100 takes a confusion network as an input. The confusion network is represented by two sequences, an arc word set sequence and an arc weight set sequence.

The operation of the confusion network classification apparatus 100 will be described according to FIG. 3. The confusion network distributed representation sequence generating part 110 generates a confusion network distributed representation sequence, which is a vector sequence, from the arc word set sequence and the arc weight set sequence constituting the confusion network (S110). The confusion network distributed representation sequence generating part 110 will be described below in detail.

[Confusion Network Distributed Representation Sequence Generating Part 110]

Input: a confusion network (an arc word set sequence and an arc weight set sequence)

Output: a confusion network distributed representation sequence

The confusion network distributed representation sequence generating part 110 generates a confusion network distributed representation sequence $U_1, U_2, \ldots, U_T$ from an arc word set sequence $W_1, W_2, \ldots, W_T$ and an arc weight set sequence $C_1, C_2, \ldots, C_T$ (S110). Here, T is an integer equal to or larger than 1. Note that both of a length of the arc word set sequence and a length of the arc weight set sequence are T, and the lengths of the two sequences are the same.

The t-th arc word set $W_t$ ($1 \leq t \leq T$) constituting the confusion network is represented by:

$$W_t = (w_{t1}, w_{t2}, \ldots, w_{tN_t})$$ [Formula 2]

Here, $w_{tn}$ indicates an arc word of the n-th kind included in the arc word set $W_t$ ($1 \leq n \leq N_t$; $N_t$ is an integer equal to or larger than 1); and $N_t$ is the number of kinds of arc words included in the arc word set $W_t$, which is a value that differs according to t.

Similarly, the t-th arc weight set $C_t$ ($1 \leq t \leq T$) constituting the confusion network is represented by:

$$C_t = (c_{t1}, c_{t2}, \ldots, c_{tN_t})$$ [Formula 3]

Here, $c_{tn}$ indicates an arc weight of the n-th kind included in the arc weight set $C_t$ ($1 \leq n \leq N_t$). Note that the following formula is satisfied.

$$\sum_n c_{tn} = 1$$ [Formula 4]

Further, it is assumed that the arc weight $c_{tn}$ and the arc word $w_{tn}$ correspond to each other. That is, the arc weight $c_{tn}$ indicates a probability of the arc word $w_{tn}$ being correct.

Figure 4:
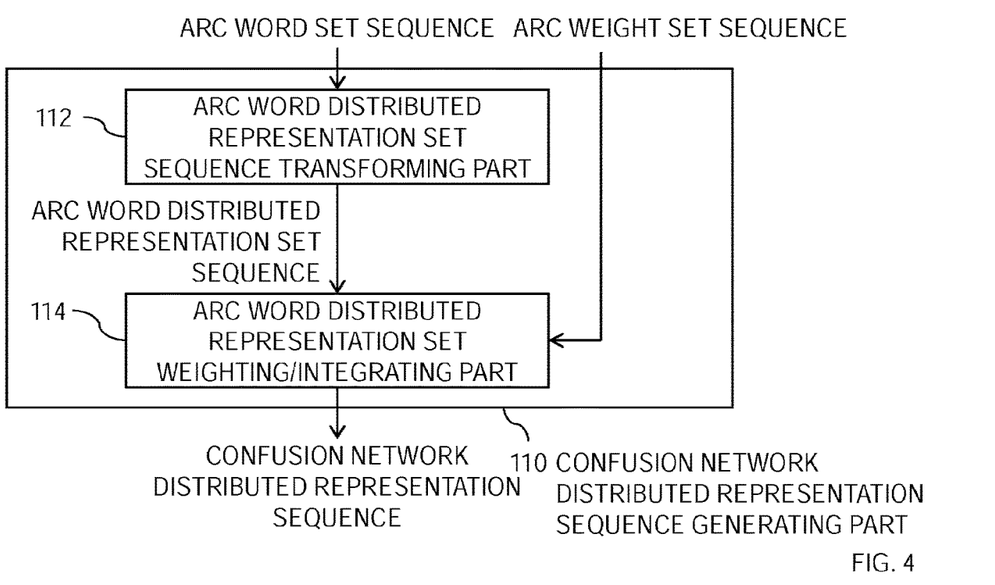
FIG. 4 is a diagram showing an example of a configuration of a confusion network distributed representation sequence generating part 110.
Figure 5:
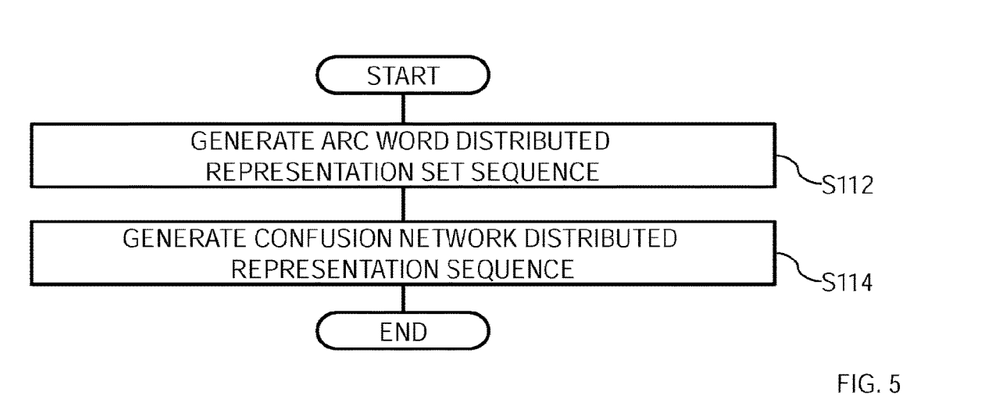
FIG. 5 is a diagram showing an example of an operation of the confusion network distributed representation sequence generating part 110.

The confusion network distributed representation sequence generating part 110 will be described below with reference to FIGS. 4 and 5. FIG. 4 is a block diagram showing a configuration of the confusion network distributed representation sequence generating part 110. FIG. 5 is a flowchart showing an operation of the confusion network distributed representation sequence generating part 110. As shown in FIG. 4, the confusion network distributed representation sequence generating part 110 includes an arc word distributed representation set sequence transforming part 112 and an arc word distributed representation set weighting/integrating part 114.

[Arc Word Distributed Representation Set Sequence Transforming Part 112]

Input: an arc word set sequence

Output: an arc word distributed representation set sequence

By transforming the arc word $w_{tn}$ included in the arc word set $W_t$ to a word distributed representation $\omega_{tn}$, the arc word distributed representation set sequence transforming part 112 obtains an arc word distributed representation set $\Omega_t = (\omega_{t1}, \omega_{t2}, \ldots, \omega_{tN_t})$ and generates an arc word distributed representation set sequence $\Omega_1, \Omega_2, \ldots, \Omega_T$ (S112). For each arc word $w_{tn}$ ($1 \leq n \leq N_t$) of the t-th arc word set $W_t$ ($1 \leq t \leq T$), the arc word $w_{tn}$, which is a symbol, is transformed to the word distributed representation $\omega_{tn}$, which is a vector, by the following formula:

$$\omega_{tn} = \text{EMBEDDING}(w_{tn})$$ [Formula 5]

Here, EMBEDDING(•) is a function of transforming a word to a word vector of a predetermined dimensionality; and EMBEDDING(•) is indicated, for example, as a linear transformation function. Note that EMBEDDING(•) is not limited to linear transformation but may be any function if the function has a similar function. For example, a transformation matrix for transforming a word to a word distributed representation can be used. The transformation matrix is a dictionary (a code book table) in which a corresponding vector is prepared for each word, and the number of dimensions and values of the vector are decided when the dictionary is generated. Further, as other examples, a function of calculating a word vector or a concept vector used in natural language processing, and the like are given. The word vector is a vector obtained by utilizing co-occurrence frequency of words, and the concept vector is a vector obtained by compressing a word vector.

[Arc Word Distributed Representation Set Weighting/Integrating Part 114]

Input: an arc word distributed representation set sequence and an arc weight set sequence Output: a confusion network distributed representation sequence The arc word distributed representation set weighting/integrating part 114 generates the confusion network distributed representation sequence $U_1, U_2, \ldots, U_T$ from the arc word distributed representation set sequence $\Omega_1, \Omega_2, \ldots, \Omega_T$ and the arc weight set sequence $C_1, C_2, \ldots, C_T$ (S114). For each t ($1 \leq t \leq T$), the arc word distributed representation set weighting/integrating part 114 generates the confusion network distributed representation $U_t$ from the arc word distributed representation set $\Omega_t$ and the arc weight set $C_t$. Specifically, by integrating the word distributed representation $\omega_{tn}$ ($1 \leq n \leq N_t$) by weighting, the confusion network distributed representation $U_t$ is generated by the following formula:

$$U_t = \sum_n c_{tn} \omega_{tn}$$ [Formula 6]

By performing this integration processing for all of t ($1 \leq t \leq T$), the confusion network distributed representation sequence $U_1, U_2, \ldots, U_T$ is obtained.

Next, the class label estimating part 120 estimates a class label showing a class of the confusion network from the confusion network distributed representation sequence generated at S110 (S120). The class label estimating part 120 will be described below in detail.

[Class Label Estimating Part 120]
Input: a confusion network distributed representation sequence
Output: a class label The class label estimating part 120 estimates a class label L from the confusion network distributed representation sequence $U_1, U_2, \ldots, U_T$ (S120). By executing such processing as below for the confusion network distributed representation sequence $U_1, U_2, \ldots, U_T$, the class label L is estimated.

$$h = NN(U_1, U_2, \ldots, U_T)$$

$$P = \mathrm{DISCRIMINATE}(h) \quad \text{[Formula 7]}$$

Here, h denotes a fixed-length real-valued vector obtained by transforming the confusion network distributed representation sequence $U_1, U_2, \ldots, U_T$ and indicates a feature value of the confusion network distributed representation sequence $U_1, U_2, \ldots, U_T$. This real-valued vector h is used as a feature at the time of estimating a class label. Note that it is assumed that a dimensionality of the real-valued vector h is determined in advance. Further, P denotes probability distribution indicating a posterior probability corresponding to each class to be a classification destination.

Here, NN(•) is a function of transforming a real-valued vector sequence to a fixed-length real-valued vector. As NN(•), for example, RNN or CNN can be used. Note that NN(•) is not limited to RNN or CNN but may be any function if the function has a similar function. NN(•) may be realized using machine learning other than a neural network such as RNN and CNN, for example, SVM (Support Vector Machine) or Random Forest.

Here, DISCRIMINATE(•) is a function for calculating a posterior probability corresponding to each class from a fixed-length vector. As DISCRIMINATE(•), for example, a softmax function can be used.

The class label L to be an output is a label corresponding to a class with the highest probability in probability distribution P.

Note that it is possible to, by omitting the class label estimating part 120 from the confusion network classification apparatus 100, configure a confusion network distributed representation generation apparatus 101 (not shown). That is, the confusion network distributed representation generation apparatus 101 includes the confusion network distributed representation sequence generating part 110 and the recording part 190, and generates a confusion network distributed representation sequence with a confusion network as an input.

(Method for Configuring Confusion Network Distributed Representation Sequence Generating Part 110 and Class Label Estimating Part 120)

As stated before, NN(•), which is a part of the function of the class label estimating part 120, can be configured as a neural network, and the class label estimating part 120 itself can be configured as a neural network. That is, the class label estimating part 120 can be configured as a neural network (for example, like RNN and CNN) that outputs a class label with a confusion network distributed representation sequence as an input.

Similarly, the confusion network distributed representation sequence generating part 110 can also be configured as a neural network (for example, like RNN and CNN) that outputs a confusion network distributed representation sequence with a confusion network as an input.

Furthermore, by combining the confusion network distributed representation sequence generating part 110 and the class label estimating part 120 so that an output of the neural network constituting the confusion network distributed representation sequence generating part 110 becomes an input of the neural network constituting the class label estimating part 120, one neural network having both of the function of the confusion network distributed representation sequence generating part 110 and the function of the class label estimating part 120 can be configured. In this case, it becomes possible to learn parameters of the neural network constituting the confusion network distributed representation sequence generating part 110 and parameters of the neural network constituting the class label estimating part 120 at the same time, and learning is performed in a form of the parameters of the two neural networks being optimized as a whole.

Of course, learning may be performed so that the parameters of the neural network constituting the confusion network distributed representation sequence generating part 110 and the parameters of the neural network constituting the class label estimating part 120 are independently optimized by individually learning the parameters of the neural network constituting the confusion network distributed representation sequence generating part 110 and the parameters of the neural network constituting the class label estimating part 120.

Note that the confusion network distributed representation sequence generating part 110 or the class label estimating part 120 is not necessarily required to be configured as a neural network but may be configured by other machine learning. For example, the class label estimating part 120 may be configured with SVM or Random Forest. Furthermore, the confusion network distributed representation sequence generating part 110 or the class label estimating part 120 may be configured by a method other than machine learning.

According to the present invention, by representing a confusion network as a confusion network distributed representation sequence, which is a vector sequence, it becomes possible to use the confusion network as an input for machine learning.

Further, since it becomes possible to configure a class classifier using a confusion network distributed representation sequence, it becomes possible to configure a class classifier with a better performance, for example, in comparison with a case of configuring a class classifier using only one word string like a speech recognition result. This is because a confusion network includes various information about hypothesis space of speech recognition, including a speech recognition result. That is, since a confusion network includes a plurality of candidates for a speech recognition result and information about a probability of each candidate being correct, it is possible to learn a class classifier based on whether a recognition error or not (or how accurately recognition seems to be correct), and, as a result, performance of the learned class classifier is increased.

Application Examples

Description has been made so far with it kept in mind to learn a class classifier using a confusion network obtained in a process of speech recognition, and configure a confusion network classification apparatus using the class classifier. If a confusion network is generated in a first-stage estimation process, like a combination of a speech recognizer corresponding to a first-stage estimator and a class classifier corresponding to a second-stage estimator, it is possible to learn the second-stage estimator in a similar framework. As the combination of the first-stage estimator and the second-stage estimator, for example, a combination such as a text basic analyzer and a class classifier, a speech recognizer and a text searcher, or the text basic analyzer and the text searcher is also possible.

Second Embodiment

Figure 6:
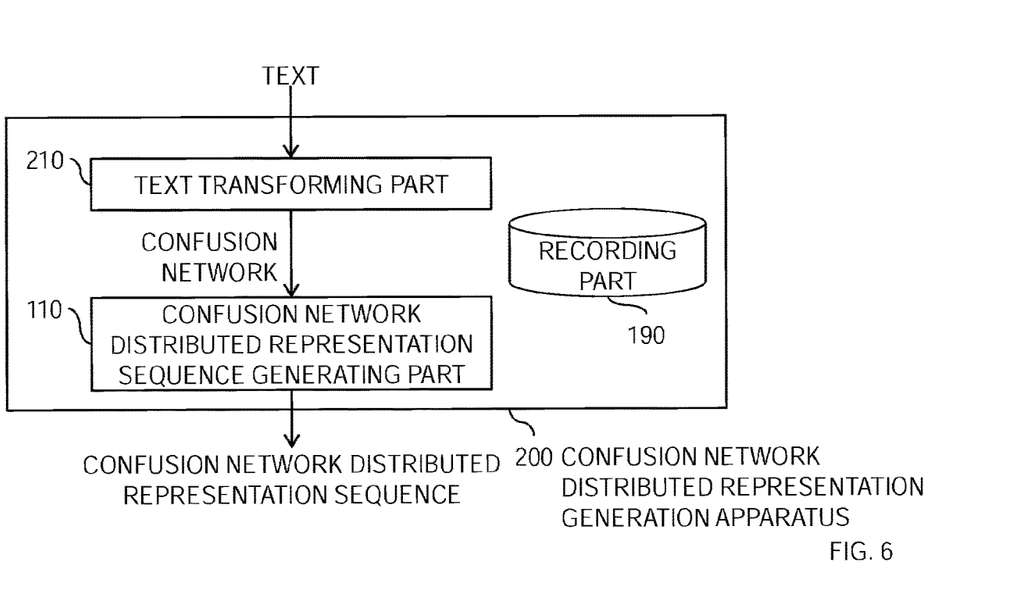
FIG. 6 is a diagram showing an example of a configuration of a confusion network distributed representation generation apparatus 200.

Though a confusion network is an input in the confusion network distributed representation generation apparatus 101 described in the first embodiment, text which is a word sequence may be an input. Therefore, here, a confusion network distributed representation generation apparatus 200 will be described that generates a confusion network distributed representation sequence with text which is a word sequence as an input.

Figure 7:
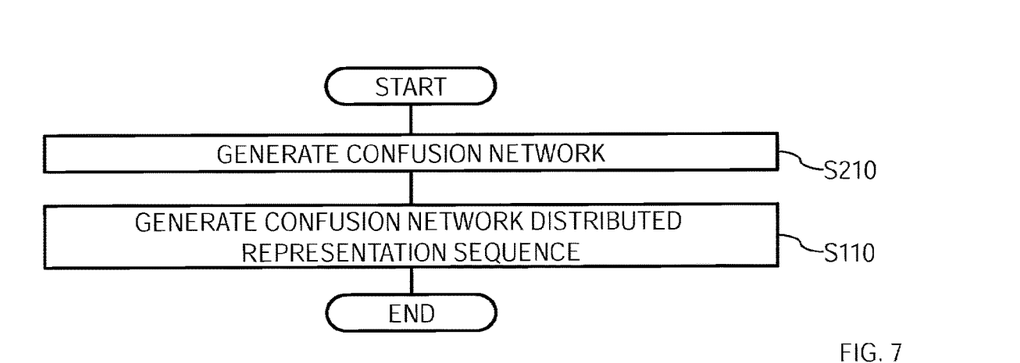
FIG. 7 is a diagram showing an example of an operation of the confusion network distributed representation generation apparatus 200.

The confusion network distributed representation generation apparatus 200 will be described below with reference to FIGS. 6 and 7. FIG. 6 is a block diagram showing a configuration of the confusion network distributed representation generation apparatus 200. FIG. 7 is a flowchart showing an operation of the confusion network distributed representation generation apparatus 200. As shown in FIG. 6, the confusion network distributed representation generation apparatus 200 includes a text transforming part 210, the confusion network distributed representation sequence generating part 110, and the recording part 190. The recording part 190 is a component that appropriately records information required for processing by the confusion network distributed representation generation apparatus 200.

The confusion network distributed representation generation apparatus 200 takes text (a word sequence) as an input.

The operation of the confusion network distributed representation generation apparatus 200 will be described according to FIG. 7. The text transforming part 210 generates, from a word sequence, an arc word set sequence and an arc weight set sequence constituting a confusion network that represents the word sequence (S210). The text transforming part 210 will be described below in detail.

[Text Transforming Part 210]
Input: text (a word sequence)
Output: a confusion network (an arc word set sequence and an arc weight set sequence)

The text transforming part 210 generates, from a word sequence $w_1, w_2, \ldots, w_T$, an arc word set sequence $W_1, W_2, \ldots, W_T$ and an arc weight set sequence $C_1, C_2, \ldots, C_T$ constituting a confusion network that represents the word sequence (S210). Here, the word sequence $w_1, w_2, \ldots, w_T$ can be obtained, for example, by dividing input text using morphological analysis. An arc word set $W_t$ is generated by the following formula:

$$W_t = (w_t)$$ [Formula 8]

That is, the arc word set $W_t$ ($1 \leq t \leq T$) is a set that includes one word $w_t$ as an arc word. Further, an arc weight set $C_t$ is generated by the following formula:

$$C_t = (1)$$ [Formula 9]

That is, the arc weight set $C_t$ ($1 \leq t \leq T$) is a set that includes only an arc weight 1 corresponding to the word $w_t$. Thereby, the arc word set sequence $W_1, W_2, \ldots, W_T$ and the arc weight set sequence $C_1, C_2, \ldots, C_T$ corresponding to the word sequence $w_1, w_2, \ldots, w_T$ are obtained.

Next, the confusion network distributed representation sequence generating part 110 generates a confusion network distributed representation sequence, which is a vector sequence, from the arc word set sequence and the arc weight set sequence constituting the confusion network (S110).

According to the present invention, it becomes possible to generate a confusion network distributed representation sequence from text. Here, the text to be an input is not limited to a speech recognition result. Therefore, it becomes possible to learn a class classifier using all of a confusion network corresponding to a speech recognition result that includes a speech recognition error, a confusion network corresponding to a speech recognition result that does not include a speech recognition error and a confusion network generated from general text. Further, it becomes possible to learn a class classifier using not only learning data for a class classifier that classifies a speech recognition result but also learning data created for text classification in natural language processing.

Third Embodiment

In a third embodiment, description will be made on a method for calculating similarity between confusion networks using a confusion network distributed representation sequence.

Figure 8:
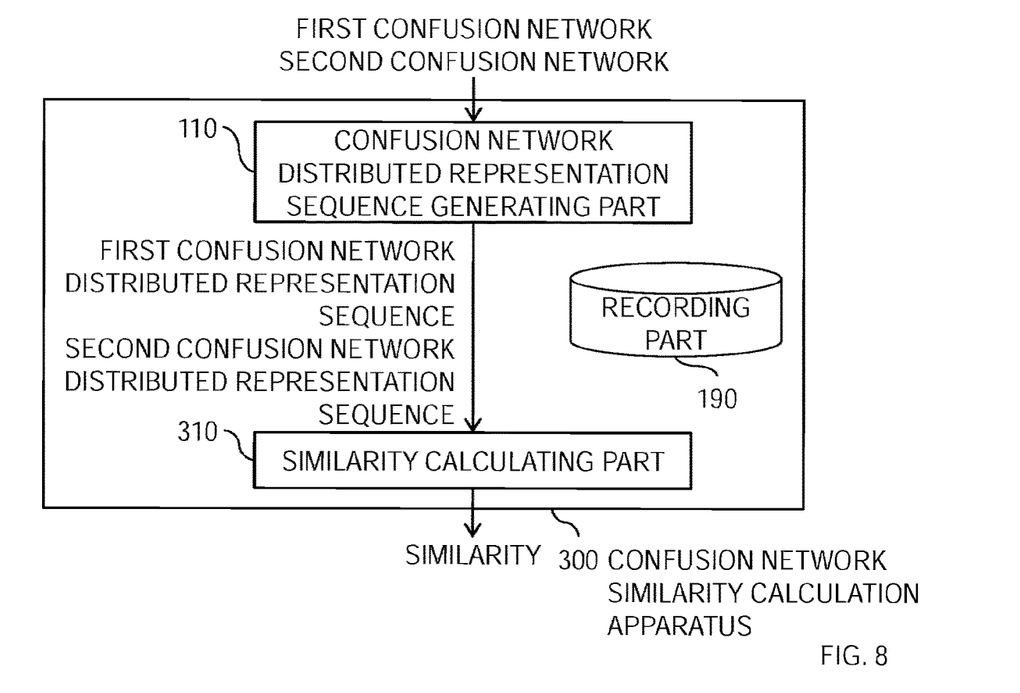
FIG. 8 is a diagram showing an example of a configuration of a confusion network similarity calculation apparatus 300.
Figure 9:
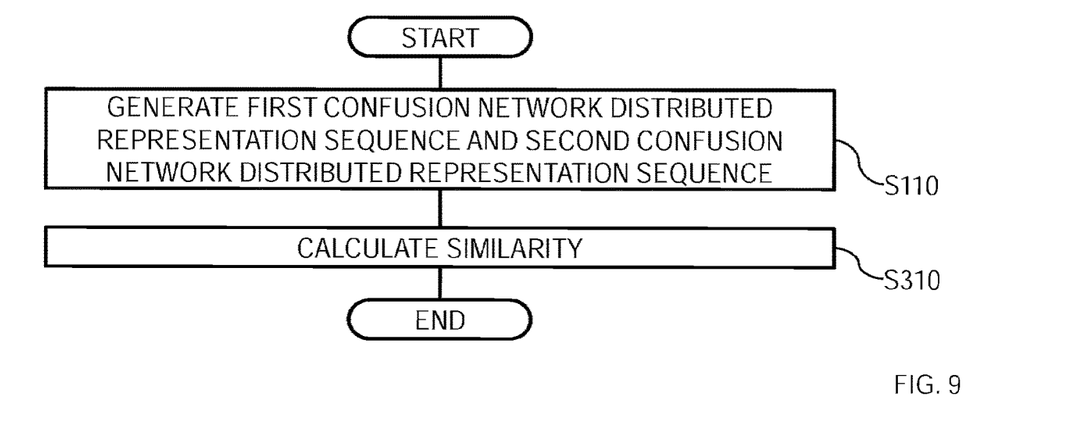
FIG. 9 is a diagram showing an example of an operation of the confusion network similarity calculation apparatus 300.

A confusion network similarity calculation apparatus 300 will be described below with reference to FIGS. 8 and 9. FIG. 8 is a block diagram showing a configuration of the confusion network similarity calculation apparatus 300. FIG. 9 is a flowchart showing an operation of the confusion network similarity calculation apparatus 300. As shown in FIG. 8, the confusion network similarity calculation apparatus 300 includes the confusion network distributed representation sequence generating part 110, a similarity calculating part 310 and the recording part 190. The recording part 190 is a component that appropriately records information required for processing by the confusion network similarity calculation apparatus 300.

The confusion network similarity calculation apparatus 300 takes two confusion networks (a first confusion network and a second confusion network) as inputs. Each of the confusion networks to be an input may be, for example, such that is obtained at the time of speech recognition or such that is obtained by transforming text by processing similar to the processing of the text transforming part 210.

The operation of the confusion network similarity calculation apparatus 300 will be described according to FIG. 9. The confusion network distributed representation sequence generating part 110 generates a first confusion network distributed representation sequence from the first confusion network and generates a second confusion network distributed representation sequence from the second confusion network (S110).

The similarity calculating part 310 calculates similarity between the first confusion network and the second confusion network from the first confusion network distributed representation sequence and the second confusion network distributed representation sequence (S310). Since both of the first confusion network distributed representation sequence and the second confusion network distributed representation sequence are vector sequences, for example, a vector sum of the first confusion network distributed representation sequence and a vector sum of the second confusion network distributed representation sequence are calculated, and similarity between the vectors is calculated. Further, for example, cosine similarity can be used as vector similarity.

According to the present invention, it becomes possible to indicate a degree of similarity between two confusion networks as a numerical value.

By incorporating such a configuration into a speech search system or a spoken dialogue system and using the configuration for a process for searching a text database with speech as an input, it is possible to reduce influence given by an input speech recognition error on the search of the text database. Specifically, similarity between a first confusion network corresponding to input speech and a second confusion network corresponding to text, which is a search result, is calculated. If the similarity is smaller than a predetermined value, input of speech is prompted again on an assumption that an input speech recognition result has an error.

Further, by applying the framework of the confusion network distributed representation and the calculation of similarity between confusion networks described above to the process for searching a text database with speech as an input, it is possible to reduce influence given by an input speech recognition error on the search of the text database. Specifically, each piece of text in the text database is transformed to a second confusion network distributed representation sequence in advance; similarity is calculated using a first confusion network distributed representation sequence corresponding to input speech and a second confusion network distributed representation sequence corresponding to each piece of text in the database; and a piece of text with the highest similarity is returned as a search result.

<Supplementary Notes>

For example, as a single hardware entity, an apparatus of the present invention has an inputting part to which a keyboard and the like can be connected, an outputting part to which a liquid crystal display and the like can be connected, a communicating part to which a communication device (for example, a communication cable) capable of communicating with the outside of the hardware entity can be connected, a CPU (Central Processing Unit; a cache memory and a register may be provided), a RAM and a ROM which are memories, an external storage device which is a hard disk, and a bus connecting these inputting part, outputting part, communicating part, CPU, RAM, ROM and external storage device so that data can be exchanged thereamong. Further, the hardware entity may be provided with a device (a drive) or the like capable of reading from/writing to a recording medium such as a CD-ROM as necessary. As a physical entity provided with such hardware resources, there is a general-purpose computer or the like.

In the external storage device of the hardware entity, programs required to realize the functions described above and data required for processing by the programs are stored (Other than the external storage device, the program may be stored, for example, in the ROM which is a read-only storage device). Data and the like obtained by the processing by these programs are appropriately stored in the RAM or the external storage device.

In the hardware entity, each program stored in the external storage device (or the ROM or the like) and data required for processing by the program are read into the memory as necessary, and interpretation, execution and processing are appropriately performed by the CPU. As a result, the CPU realizes a predetermined function (each of the above components represented as a . . . part, a . . . unit or the like).

The present invention is not limited to the above embodiments but can be appropriately changed within a range not departing from the spirit of the present invention. Further, the processes described in the above embodiments are not only executed in time series in the order of description. The processes may be executed in parallel or individually according to processing capability of an apparatus that executes the processes or as necessary.

As already stated, in the case of realizing the processing functions in the hardware entity (the apparatus of the present invention) described in the above embodiments by a computer, processing content of the functions that the hardware entity should have is written by a program. Then, by executing the program on the computer, the processing functions of the hardware entity are realized on the computer.

The program in which the processing content is written can be recorded in a computer-readable recording medium. As the computer-readable recording medium, anything, for example, a magnetic recording device, an optical disk, a magneto-optical recording medium, a semiconductor memory or the like is possible. Specifically, for example, a hard disk device, a flexible disk, a magnetic tape or the like can be used as the magnetic recording device; a DVD (Digital Versatile Disc), a DVD-RAM (Random Access Memory), a CD-ROM (Compact Disc Read Only Memory), a CD-R (Recordable)/RW (ReWritable) or the like can be used as the optical disk; and an MO (Magneto-Optical disc) or the like can be used as the magneto-optical recording medium; and an EEP-ROM (Electronically Erasable and Programmable-Read Only Memory) or the like can be used as the semiconductor memory.

Distribution of this program is performed, for example, by performing sales, transfer, lending or the like of a portable recording medium such as a DVD or a CD-ROM in which the program is recorded. Furthermore, a configuration is also possible in which the program is stored in a storage device of a server computer and is caused to be distributed by being transferred from the server computer to other computers via a network.

For example, a computer that executes such a program first stores the program recorded in a portable recording medium or transferred from a server computer into its own storage device once. Then, at the time of executing processing, the computer reads the program stored in its own storage device and executes the processing according to the read program. Further, as another execution form of the program, a computer may directly read the program from a portable recording medium and execute processing according to the program. Furthermore, each time a program is transferred to the computer from a sever computer, the computer may sequentially execute processing according to the received program. Further, a configuration is also possible in which the processes described above is executed by a so-called ASP (Application Service Provider) type service in which, without transferring the program to the computer from the server computer, the processing functions are realized only by an instruction to execute the program and acquisition of a result. Note that it is assumed that the program in the present form includes information that is provided for processing by an electronic calculator and is equivalent to a program (data or the like that is not a direct command to a computer but has a nature of specifying processing of the computer).

Further, though it is assumed in this form that the hardware entity is configured by causing a predetermined program to be executed on a computer, at least a part of the processing content may be realized as hardware.

The above description of the embodiments of the present invention is presented for the purpose of illustration and description. It is not intended that the description is comprehensive, and it is not intended to limit the invention to the disclosed strict form, either. Modifications and variations are possible from the teachings stated above. The embodiments are selected and expressed in order to provide the best illustration of the principle of the present invention and in order that one skilled in the art can use the present invention in various embodiments or by adding various modifications to adapt the present invention to contemplated actual use. All of such modifications and variations are within the scope of the present invention specified by the accompanying claims interpreted according to a range that is fairly, legitimately and justly given.

What is claimed is:

1. A confusion network distributed representation generation apparatus comprising:

processing circuitry that, when T is assumed to be an integer equal to or larger than 1, and $W_t=(w_{t1}, w_{t2}, \ldots, w_{tN\_t})$ ($1 \le t \le T$) and $C_t=(c_{t1}, c_{t2}, \ldots, c_{tN\_t})$ ($1 \le t \le T$) are assumed to be a t-th arc word set constituting a confusion network (wherein $w_{tn}$ ($1 \le n \le N_t$; $N_t$ is an integer equal to or larger than 1) denotes an arc word included in the arc word set $W_t$) and a t-th arc weight set constituting the confusion network (wherein $c_{tn}$ ($1 \le n \le N_t$) denotes an arc weight corresponding to the arc word $w_{tn}$), respectively, generates a confusion network distributed representation sequence $U_1, U_2, \ldots, U_T$, which is a vector sequence, from an arc word set sequence $W_1, W_2, \ldots, W_T$ and an arc weight set sequence $C_1, C_2, \ldots, C_T$ constituting the confusion network; wherein the processing circuitry is configured to:

by transforming the arc word $w_{tn}$ included in the arc word set $W_t$ to a word distributed representation $\omega_{tn}$, obtain an arc word distributed representation set $\Omega_t=(\omega_{t1}, \omega_{t2}, \ldots, \omega_{tN\_t})$ and generate an arc word distributed representation set sequence $\Omega_1, \Omega_2, \ldots, \Omega_T$; and generate the confusion network distributed representation sequence $U_1, U_2, \ldots, U_T$ from the arc word distributed representation set sequence $\Omega_1, \Omega_2, \ldots, \Omega_T$ and the arc weight set sequence $C_1, C_2, \ldots, C_T$.

2. The confusion network distributed representation generation apparatus according to claim 1, wherein the processing circuitry is configured to generate, from a word sequence $w_1, w_2, \ldots, w_T$, the arc word set sequence $W_1, W_2, \ldots, W_T$ and the arc weight set sequence $C_1, C_2, \ldots, C_T$ constituting the confusion network by the following formula:

$$W_t=(w_t)(1 \le t \le T)$$

$$C_t=(1)(1 \le t \le T)$$ [Formula 10]

3. A confusion network classification apparatus comprising:

processing circuitry that, when T is assumed to be an integer equal to or larger than 1, and $W_t=(w_{t1}, w_{t2}, \ldots, w_{tN\_t})$ ($1 \le t \le T$) and $C_t=(c_{t1}, c_{t2}, \ldots, c_{tN\_t})$ ($1 \le t \le T$) are assumed to be a t-th arc word set constituting a confusion network (wherein $w_{tn}$ ($1 \le n \le N_t$; $N_t$ is an integer equal to or larger than 1) denotes an arc word included in the arc word set $W_t$) and a t-th arc weight set constituting the confusion network (wherein $c_{tn}$ ($1 \le n \le N_t$) denotes an arc weight corresponding to the arc word $w_{tn}$), respectively, generates a confusion network distributed representation sequence $U_1, U_2, \ldots, U_T$, which is a vector sequence, from an arc word set sequence $W_1, W_2, \ldots, W_T$ and an arc weight set sequence $C_1, C_2, \ldots, C_T$ constituting the confusion network; and estimates a class label showing a class of the confusion network, from the confusion network distributed representation sequence $U_1, U_2, \ldots, U_T$; wherein the processing circuitry is configured to by transforming the arc word $w_{tn}$ included in the arc word set $W_t$ to a word distributed representation $\omega_{tn}$, obtain an arc word distributed representation set $\Omega_t=(\omega_{t1}, \omega_{t2}, \ldots, \omega_{tN\_t})$ and generate an arc word distributed representation set sequence $\Omega_1, \Omega_2, \ldots, \Omega_T$; and generate the confusion network distributed representation sequence $U_1, U_2, \ldots, U_T$ from the arc word distributed representation set sequence $\Omega_1, \Omega_2, \ldots, \Omega_T$ and the arc weight set sequence $C_1, C_2, \ldots, C_T$.

4. The confusion network classification apparatus according to claim 3, wherein the processing circuitry is configured to implement two neural networks to respectively generate the confusion network distributed representation sequence and estimate the class label; and parameters of the neural network that generates the confusion network distributed representation sequence and parameters of the neural network that estimates the class label are learned with the two neural networks as one neural network obtained by combining the two neural networks.

5. A confusion network distributed representation generation method comprising a confusion network distributed representation sequence generating step of, when T is assumed to be an integer equal to or larger than 1, and $W_t=(w_{t1}, w_{t2}, \ldots, w_{tN\_t})$ ($1 \le t \le T$) and $C_t=(c_{t1}, c_{t2}, \ldots, c_{tN\_t})$ ($1 \le t \le T$) are assumed to be a t-th arc word set constituting a confusion network (wherein $w_{tn}$ ($1 \le n \le N_t$; $N_t$ is an integer equal to or larger than 1) denotes an arc word included in the arc word set $W_t$) and a t-th arc weight set constituting the confusion network (wherein $c_{tn}$ ($1 \le n \le N_t$) denotes an arc weight corresponding to the arc word $w_{tn}$), respectively, a confusion network distributed representation generation apparatus generating a confusion network distributed representation sequence $U_1, U_2, \ldots, U_T$, which is a vector sequence, from an arc word set sequence $W_1, W_2, \ldots, W_T$ and an arc weight set sequence $C_1, C_2, \ldots, C_T$ constituting the confusion network; wherein the confusion network distributed representation sequence generating step comprises:

an arc word distributed representation set sequence transforming step of, by transforming the arc word $w_{tn}$ included in the arc word set $W_t$ to a word distributed representation $\omega_{tn}$, obtaining an arc word distributed representation set $\Omega_t=(\omega_{t1}, \omega_{t2}, \ldots, \omega_{tN\_t})$ and generating an arc word distributed representation set sequence $\Omega_1, \Omega_2, \ldots, \Omega_T$; and an arc word distributed representation set weighting/integrating step of generating the confusion network distributed representation sequence $U_1, U_2, \ldots, U_T$ from the arc word distributed representation set sequence $\Omega_1, \Omega_2, \ldots, \Omega_T$ and the arc weight set sequence $C_1, C_2, \ldots, C_T$.

6. A confusion network classification method comprising a confusion network distributed representation sequence generating step of, when T is assumed to be an integer equal to or larger than 1, and $W_t=(w_{t1}, w_{t2}, \ldots, w_{tN\_t})$ ($1 \leq t \leq T$) and $C_t=(c_{t1}, c_{t2}, \ldots, c_{tN\_t})$ ($1 \leq t \leq T$) are assumed to be a t-th arc word set constituting a confusion network (wherein $w_{tn}$ $1 \leq n \leq N_t$; $N_t$ is an integer equal to or larger than 1) denotes an arc word included in the arc word set $W_t$) and a t-th arc weight set constituting the confusion network (wherein $c_{tn}$ ($1 \leq n \leq N_t$) denotes an arc weight corresponding to the arc word $w_{tn}$), respectively, a confusion network classification apparatus generating a confusion network distributed representation sequence $U_1, U_2, \ldots, U_T$, which is a vector sequence, from an arc word set sequence $W_1, W_2, \ldots, W_T$ and an arc weight set sequence $C_1, C_2, \ldots, C_T$ constituting the confusion network; and
- a class label estimating step of the confusion network classification apparatus estimating a class label showing a class of the confusion network, from the confusion network distributed representation sequence $U_1, U_2, \ldots, U_T$; wherein
  - the confusion network distributed representation sequence generating step comprises:
    - an arc word distributed representation set sequence transforming step of, by transforming the arc word $w_{tn}$ included in the arc word set $W_t$ to a word distributed representation $\omega_{tn}$, obtaining an arc word distributed representation set $\Omega_t=(\omega_{t1}, \omega_{t2}, \ldots, \omega_{tN\_t})$ and generating an arc word distributed representation set sequence $\Omega_1, \Omega_2, \ldots, \Omega_T$; and
    - an arc word distributed representation set weighting/integrating step of generating the confusion network distributed representation sequence $U_1, U_2, \ldots, U_T$ from the arc word distributed representation set sequence $\Omega_1, \Omega_2, \ldots, \Omega_T$ and the arc weight set sequence $C_1, C_2, \ldots, C_T$.

7. A computer program product comprising a non-transitory computer-readable medium storing a program that, when executed by processing circuitry of a computer, causes the computer to function as the confusion network distributed representation generation apparatus according to any of of claims 1 or 2.

8. A computer program product comprising a non-transitory computer-readable medium storing a program that, when executed by processing circuitry of a computer, causes the computer to function as the confusion network classification apparatus according to any one of claim 3 or 4.

* * * * *